May 23, 1967 K. W. KAMPERT 3,321,215
ATTACHMENT FOR TRACTOR LOADER
Filed May 6, 1965 2 Sheets-Sheet 1

INVENTOR
KEITH W. KAMPERT
BY
ATT'Y.

May 23, 1967  K. W. KAMPERT  3,321,215
ATTACHMENT FOR TRACTOR LOADER
Filed May 6, 1965  2 Sheets-Sheet 2

INVENTOR
KEITH W. KAMPERT
BY
ATT'Y.

United States Patent Office 3,321,215
Patented May 23, 1967

3,321,215
ATTACHMENT FOR TRACTOR LOADER
Keith W. Kampert, Libertyville, Ill., assignor to International Harvester Company, a corporation of Delaware
Filed May 6, 1965, Ser. No. 453,743
8 Claims. (Cl. 280—425)

This invention pertains generally to attachments for a tractor loader and more particularly pertains to a trailer spotter attachment for a tractor loader which utilizes a fifth-wheel coupler mechanism for engaging the kingpin of a trailer.

The need frequently arises to spot position trailer units of truck-trailer vehicles in loading, unloading or maintenance locations. To provide maximum utilization of the tractor units, it is occasionally necessary to provide a specialized spotting vehicle for this purpose. However, specialized equipment is expensive and the need has long existed for adapting conventional tractor loaders for the spotting operation.

Accordingly it is an object of this invention to provide a trailer spotting vehicle incorporating an attachment connected to the existing mounting pins of a conventional tractor loader.

It is another object of this invention to provide a trailer spotter attachment for a conventional tractor loader vehicle in which a fifth wheel coupler mechanism is mounted on booms which in turn are mounted on the tractor loader.

It is another object of this invention to provide a trailer spotter attachment for a four wheel vehicle in which the conventional loader mechanism is removed from the vehicle and in which boom arms supporting a fifth wheel coupler mechanism are mounted on the mounting pins of the vehicle.

It is another object of this invention to provide a fifth wheel coupler mechanism mounted on boom arms which in turn are mounted on existing mounting pins of a vehicle and in which motor means connected between the vehicle and the boom arms operate to raise and lower the fifth wheel mechanism.

Other objects and advantages of the present invention will become apparent to those skilled in the art when the following specification is read in conjunction with the accompanying drawings, wherein.

Figure 1:
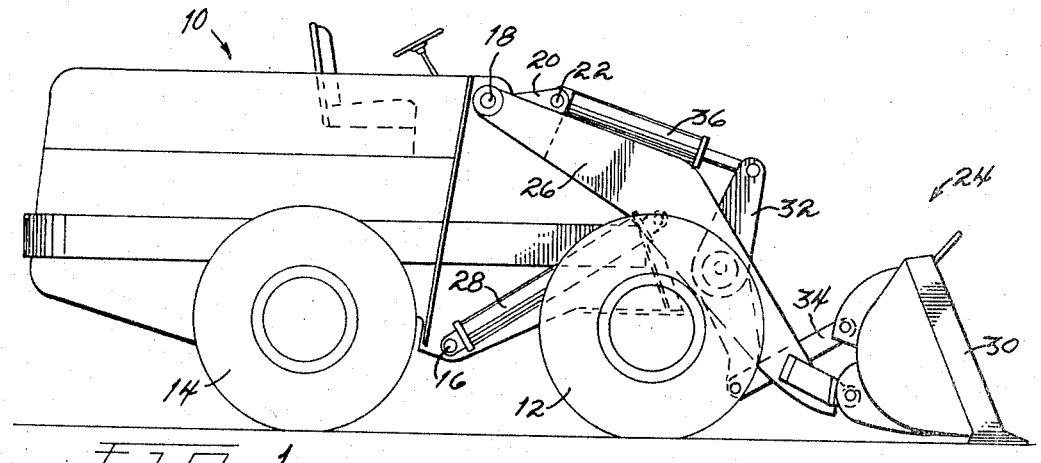
FIGURE 1 is a side elevation view of a tractor loader vehicle of the present invention in which a conventional front-end loader mechanism is attached to mounting pins on the loader vehicle.
Figure 4:
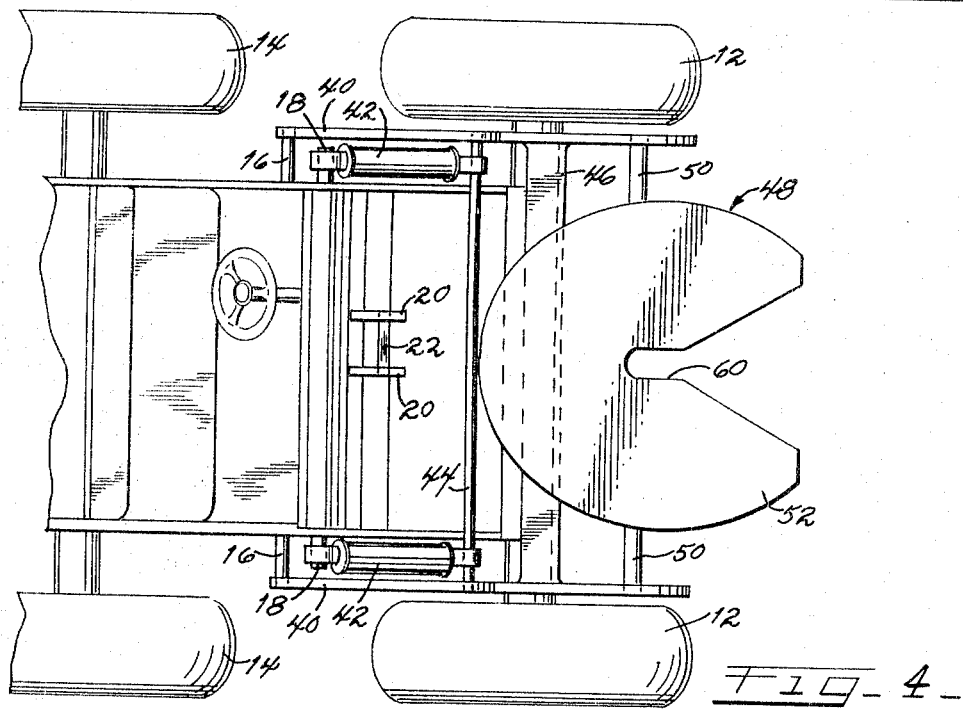
FIGURE 4 is a top plan view of the trailer spotter attachment invention of FIGURE 2.

Referring now to the drawings and particularly FIGURE 1, a tractor loader vehicle is designated generally by the numeral 10. The vehicle 10 is of the four-wheel type and has a pair of wheels 12 rotatably mounted at its forward end and a pair of wheels 14 rotatably mounted on its rearward end. A pair of transversely spaced-apart mounting pins 16 are attached to the vehicle between the wheels 12 and 14. Mounting pins 18 are attached to the vehicle at a transversely spaced-apart position above the pins 16. A pair of upwardly extending bracket members 20 are transversely spaced-apart and attached to the vehicle on either side of the central transverse axis thereof (FIGURE 4). A mounting pin 22 is transversely disposed in aligned bores provided in the brackets 20.

Figure 2:
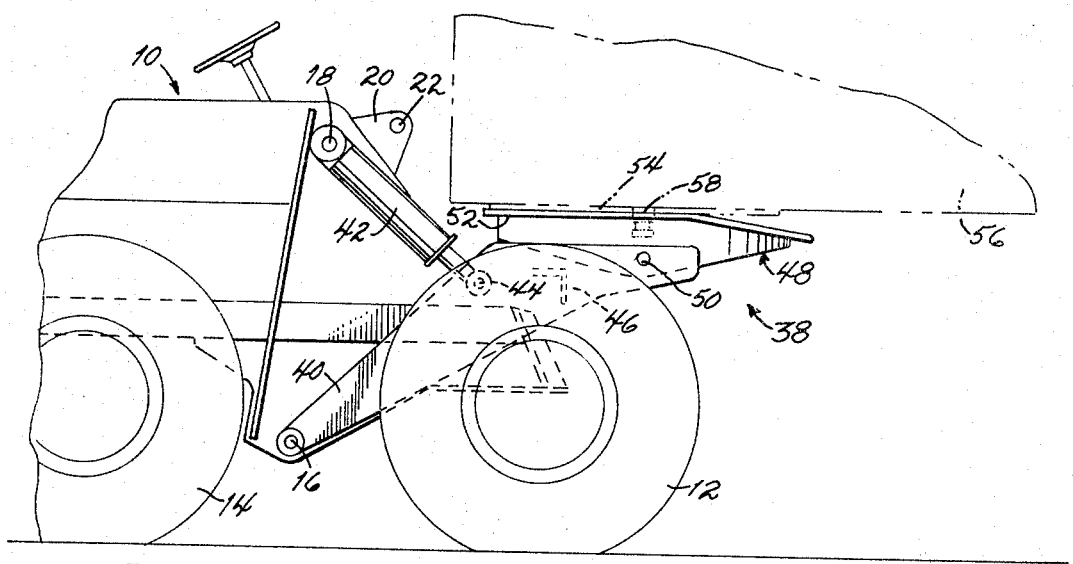
FIGURE 2 is a side elevational view of the tractor loader of FIGURE 1 in which the loader mechanism is replaced by the trailer spotter attachment of the present invention.
Figure 3:
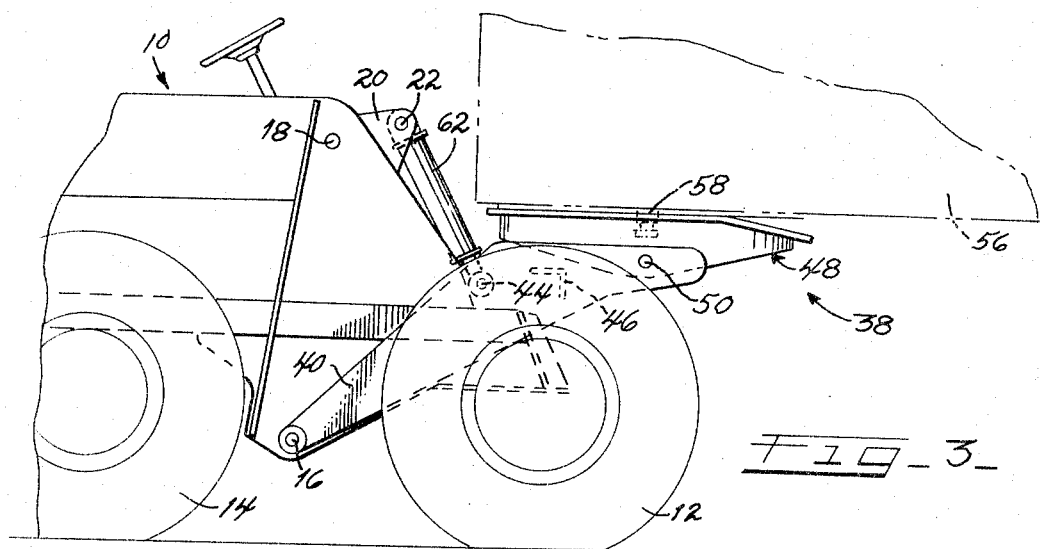
FIGURE 3 is a side elevation view of the trailer spotter attachment of FIGURE 2 showing a modified form for connecting the attachment to the vehicle.

A conventional front-end loader attachment 24 is mounted in a well known manner on the mounting pins of the vehicle 10. Thus, a pair of boom arms 26 are each pivotally mounted on a respective one of the mounting pins 18 and depend forwardly and downwardly therefrom. A pair of hydraulic rams 28 are each pivotally attached at their head ends to a respective one of the mounting pins 16 and at their rod ends to the boom arms 26. Selective extension and retraction of the hydraulic rams 28 through appropriate manipulation of hydraulic controls (not shown) will raise and lower the boom arms. A bucket 30 is pivotally mounted to the free ends of the boom arms 26. A rocker arm linkage 32 is pivotally mounted between the boom arms 26 and is connected to bucket 30 by means of a pair of links 34. An extensible hydraulic ram 36 is pivotally connected at its head end to mounting pin 22 and at its rod end to the free end of rocker arm 32. Selective extension and retraction of the ram 36 by means of hydraulic controls (not shown) will rollback or roll-forward the bucket 30 relative to the boom arms 26 in a well known manner.

Where it is desirable to use the vehicle 10 to spot position a trailer I have shown in FIGURES 2, 3, and 4 a trailer spotter attachment for the vehicle 10 which will accomplish this objective. FIGURE 2 shows the vehicle 10 with the loader attachment 24 of FIGURE 1 removed. In place thereof the trailer spotter attachment 38 is provided. The attachment 38 consists of a pair of boom arms 40 each mounted on a respective one of the pins 16 for pivotal movement in a generally vertical plane. A pair of extensible hydraulic rams 42 are provided and are pivotally mounted at their head ends to a respective one of the mounting pins 18 and at their rod ends to the boom arms 40. As shown in FIGURE 4 a transversely extending rod or pin member 44 extends between the boom arms 40. The rod ends of the rams 42 are pivotally connected to the pin member 44. Selective extension and retraction of the rams 42 by appropriate manipulation of the hydraulic controls (not shown) will respectively lower and raise the free ends of the boom arms 40. A cross-support member 46 is rigidly secured between the boom arms 40 by suitable means such as welding.

A fifth-wheel coupler mechanism 48 is pivotally mounted to the free ends of the boom arms 40 about a transverse horizontal axis defined by a pair of pins 50 secured to the boom arms 40. The coupler mechanism 48 is pivotally secured to the pins 50 in a well known manner. The coupler mechanism 48 is broadly conventional and may be of the type disclosed in the patent to Miner, No. 2,833,559 assigned to the International Harvester Company. The coupler mechanism is provided with a bearing plate 52 which rotatably engages the reinforcing plate 54 attached to the underside of a trailer unit 56. The kingpin 58 of the trailer unit is positioned in the guideway 60 of the coupler mechanism during a coupling engagement thereof. The kingpin 58 is releasably connected to the coupler mechanism 48 by a conventional knuckle jaw (not shown) such as disclosed in the Miner Patent No. 2,833,559.

FIGURE 3 shows a modification of the trailer spotter attachment of FIGURE 2 in which a single hydraulic ram 62 is employed to raise and lower the boom arms 40. The ram 62 replaces the pair of rams 42 which would otherwise be attached to the boom arms 40. The head end of ram 62 is pivotally connected to the pin member 22 secured between the brackets 20 of vehicle 10. The rod end of ram 62 is pivotally connected to the pin member 44 intermediate the ends thereof. Selective extension and retraction of ram 62 will respectively lower and raise the boom arms 40 in a manner similar to that described in connection with FIGURES 2 and 4. The coupler mechanism 48 is identical to that described in connection with FIGURE 2 and couples with the kingpin 58 of trailer unit 56 in a similar manner.

With the invention of FIGURE 2 I have provided a convenient attachment for a tractor loader which will afford easy spotting operations for a trailer unit. Thus, where it is desired to move a trailer unit to another location, a tractor such as that shown by the numeral 10 is provided with the trailer spotter attachment of the present invention. The boom arms 40 are lowered through extension of the hydraulic rams 42 so that sufficient clearance is provided under the trailer unit 56. The operator then maneuvers the vehicle 10 so the coupler mechanism 48 is slipped under the reinforcing plate 54 of the trailer. The coupler mechanism will lock the kingpin 58 in place within the guideway 60. The operator then retracts the hydraulic rams so that the boom arms 40 are raised to lift the trailer unit 56 until the landing gear (not shown) of the trailer is elevated from the ground. The vehicle 10 then maneuvers the trailer unit 56 to the desired location and the rams are extended to lower the boom arms until the trailer's landing gear contacts the ground. The coupler mechanism 48 is then unlocked from the kingpin 58 and the vehicle 10 is backed away from the trailer unit. Operation of the modified form of the invention as shown in FIGURE 3 is similar to that described in connection with FIGURE 2.

It is evident that I have provided a novel trailer spotter attachment for a tractor loader which may easily be mounted on the mounting pins normally utilized for a front end loader attachment. By this means a fifth-wheel coupler mechanism may be utilized in conjunction with a conventional tractor loader vehicle such that desired spotting of a trailer unit may be easily accomplished.

It will be understood that various changes in the details and arrangement of parts, which have been described and illustrated in order to explain the nature of the invention, may be made by those skilled in the art within the principle and scope of the invention as expressed in the appended claims.

What I claim is:

1. A trailer spotter attachment for a vehicle having pin means adapted for selectively mounting the attachment or a loader device, the improvement comprising: a boom extending forward of the vehicle and being pivotally mounted to the pin means for vertical swinging movement; motor means connected between the pin means and the boom to pivot the boom relative to the vehicle; and fifth-wheel means mounted on the free end of the boom to effect a coupling engagement with the trailer.

2. A trailer spotter attachment for a four wheel vehicle having first pin means positioned between the forward and rearward wheels and second pin means positioned substantially above the first pin means, the improvement comprising: a boom pivotally mounted at one end thereof to the first pin means; motor means connected between the second pin means and the boom to pivot the boom relative to the vehicle; and fifth-wheel means mounted on the free end of the boom to engage the trailer for a spotting movement thereof.

3. A trailer spotter attachment for a four wheel vehicle having first pin means positioned between the forward and rearward wheels and second pin means positioned substantially above the first pin means, the improvement comprising: a boom pivotally mounted at one end thereof to the first pin means; motor means connected between the second pin means and the boom to pivot the boom relative to the vehicle; and a fifth-wheel coupler plate pivotally mounted on the free end of the boom to releasably engage the trailer.

4. A trailer spotter attachment for a four wheel vehicle having first pin means positioned between the forward and rearward wheels and second pin means positioned above the first pin means, the improvement comprising: a pair of boom arms mounted on the first pin means and pivotally movable in a substantially vertical plane; a pair of extensible hydraulic rams each being pivotally mounted at their one end to the second pin means and at their other end to a respective boom arm; and fifth-wheel means mounted on the free end of the boom to releasably engage the trailer.

5. A trailer spotter attachment for a four wheel vehicle having first pin means positioned between the forward and rearward wheels and second pin means positioned substantially above the first pin means, the improvement comprising: a pair of boom arms mounted on the first pin means and pivotally movable in a substantially vertical plane, a pair of extensible hydraulic rams each being pivotally mounted at their one end to the second pin means and at their other end to a respective boom arm; and a fifth-wheel coupler plate pivotally mounted on the free end of the boom to releasably engage the trailer.

6. A trailer spotter attachment for a four wheel vehicle having a first pair of mounting pins positioned between the forward and rearward wheels, a second pair of mounting pins positioned above the first pair of pins, and a fifth mounting pin positioned on the transverse center of the tractor, the improvement comprising: a pair of boom arms, each boom arm being pivotally mounted at one end to a respective one of the first pins and having a free end extending forwardly and upwardly from the tractor; motor means connected between the fifth mounting pin and the pair of boom arms for pivotal movement thereof relative to the vehicle; and fifth-wheel means mounted on the free ends of the boom arms to releasably engage the trailer for a spotting movement thereof.

7. A trailer spotter attachment for a four wheel vehicle having a first pair of mounting pins positioned between the forward and rearward wheels, a second pair of mounting pins positioned above the first pair of pins, and a fifth mounting pin positioned on the transverse center of the vehicle, the improvement comprising: a pair of boom arms mounted on the first pin means and pivotally movable in a substantially vertical plane; an extensible hydraulic ram being pivotally mounted at one end to the fifth mounting pin and at the other end to the pair of boom arms; and a fifth-wheel coupler plate pivotally mounted between the free ends of the boom to releasably engage the trailer.

8. A trailer spotter attachment for a four wheel vehicle having a first pair of mounting pins positioned between the forward and rearward wheels, and a second mounting pin positioned on the transverse center of the tractor, the improvement comprising: a pair of boom arms, each arm being mounted at one end to a respective one of the first pins; a transversely disposed pin member connected between the arms; an extensible hydraulic ram pivotally connected at its end to the second mounting pin and at its other end to the transverse pin member; and fifth-wheel means mounted on the free ends of the boom arms to releasably engage the trailer for a spotting movement thereof.

References Cited by the Examiner

UNITED STATES PATENTS

| | | | |
|---|---|---|---|
| 2,986,292 | 5/1961 | Kampert et al. | 214—140 |
| 3,112,040 | 11/1963 | Levitt et al. | 214—38 |
| 3,227,300 | 1/1966 | Kampert | 214—674 |

FOREIGN PATENTS 477,394  10/1951  Canada.

LEO FRIAGLIA, *Primary Examiner.*